United States Patent [19]

Quintana et al.

[11] Patent Number: 5,539,684
[45] Date of Patent: Jul. 23, 1996

[54] METHOD AND APPARATUS FOR CALCULATING FLOATING POINT EXPONENT VALUES

[75] Inventors: Eric E. Quintana; Daniel T. Marquette, both of Austin, Tex.

[73] Assignee: Motorola, Inc., Schaumburg, Ill.

[21] Appl. No.: 529,469

[22] Filed: Sep. 18, 1995

Related U.S. Application Data

[63] Continuation of Ser. No. 164,863, Dec. 10, 1993, abandoned.

[51] Int. Cl.$^6$ .............................. G06F 7/52; G06F 7/552
[52] U.S. Cl. ................................................................ 364/748
[58] Field of Search ...................... 364/748, 752, 364/764

[56] References Cited

U.S. PATENT DOCUMENTS

| | | | |
|---|---|---|---|
| 4,975,868 | 12/1990 | Freerksen | 364/748 |
| 5,150,320 | 9/1992 | Nakayama | 364/748 |
| 5,166,898 | 11/1992 | Ishihara | 364/748 |
| 5,204,828 | 4/1993 | Kohn | 364/748 |
| 5,341,321 | 8/1994 | Karp et al. | 364/748 |
| 5,373,461 | 12/1994 | Bearden et al. | 364/748 |

*Primary Examiner*—David H. Malzahn
*Attorney, Agent, or Firm*—Keith E. Witek

[57] ABSTRACT

A data processing system (10) has a circuit for determining floating point exponents for divide operations and square root operations. The circuit has two input multiplexers (26 and 28) which provide exponent information or constants to an adder (30). The exponent information and constants are processed by the adder (30) to output three possible exponent values for either a divide operation or a square root operation. The three possible exponent values are stored in three registers (34, 36, and 38). A multiplexer (40) used mantissa rounding and normalizing information to determine which exponent of the three possible exponent values are correct for the current floating point calculation.

25 Claims, 3 Drawing Sheets

METHOD AND APPARATUS FOR CALCULATING FLOATING POINT EXPONENT VALUES

This application is a continuation of prior application Ser. No. 08/164.863, filed on Dec. 10, 1993, entitled "A METHOD AND APPARATUS FOR CALCULATING FLOATING POINT EXPONENT VALUES", now abandoned. (original title)

FIELD OF THE INVENTION

The present invention relates generally to semiconductor circuits, and more particularly, to floating point exponent circuits for aiding in divide and square root floating point operations.

BACKGROUND OF THE INVENTION

Several data processor designs offer floating-point calculations. A floating-point value consists of two pieces: (1) an exponent; and (2) a mantissa. It is common that each of the exponent and mantissa values are calculated separately and combined to create the final floating-point result.

One known microprocessor exponent calculation for floating-point divide and floating-point square root does not begin until the mantissa portion of the result has been calculated. Thus the execution time for these instructions is the sum of the calculation time of the mantissa plus the calculation time of the exponent (i.e., the exponent is serially calculated after the mantissa is calculated). This results in an overall inefficient and relatively long instruction execution time for floating point operations. This known microprocessor also uses multiple adders in its exponent calculation, which consumes a significant amount of integrated circuit die space and increases cost and design times.

Another known microprocessor also performs exponent calculations for floating-point divide. This calculation occurs in parallel to the mantissa calculation, but it does so using multiple exponent adder circuits. Therefore, this known microprocessor requires a larger surface area and cost in order to implement.

SUMMARY OF THE INVENTION

The previously mentioned disadvantages are overcome and other advantages achieved with the present invention. In one form, the present invention comprises a data processing system which has an execution device coupled to a floating point unit. The floating point unit has a single adder, a plurality of storage locations, and a selection circuit. The single adder receives as input at least one floating point exponent value. The single adder has an output for providing a plurality of output floating point exponent values. Each of the output floating point exponent values are unequal to all other floating point values in the plurality of floating point values. The plurality of storage locations are used to store the plurality of output floating point values. The selection circuit has a plurality of inputs for receiving the output floating point values from the plurality of storage locations, and has an output for providing a single exponent value from one of the inputs in the plurality of inputs.

In another form, the invention comprises a method for providing a floating point exponent value for a data processor. The method begins by providing at least one floating point exponent value to a single adder circuit. The at least one floating point exponent is manipulated to produce more than one possible result exponent value via the single adder circuit. Based upon mantissa information, one of the more than one possible result exponent value is selected as the correct output exponent value.

The present invention will be more clearly understood from the detailed description below in conjunction with the accompanying drawings.

Figure 1:
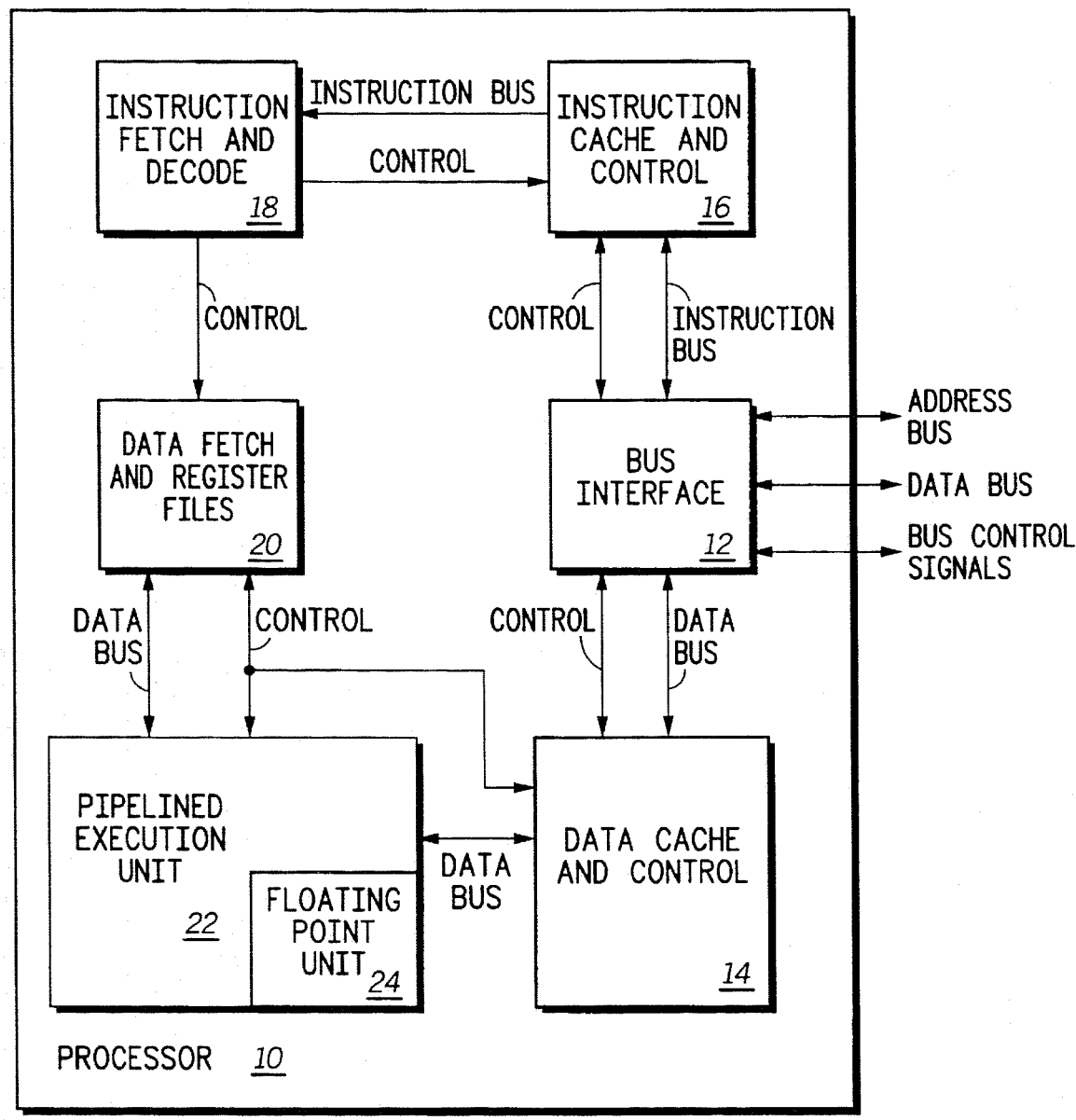
FIG. 1 illustrates, in a block diagram, a data processing system in accordance with the present invention.

It will be appreciated that for simplicity and clarity of illustration, elements illustrated in the FIGURES have not necessarily been drawn to scale. For example, the dimensions of some of the elements are exaggerated relative to other elements for clarity. Further, where considered appropriate, reference numerals have been repeated among the FIGURES to indicate corresponding or analogous elements.

DESCRIPTION OF A PREFERRED EMBODIMENT

Generally, the present invention provides a floating point exponent precalculation circuit for divide operations and square root operations and a method of providing exponent values for divide and square root operations. Furthermore, the floating point exponent precalculation circuit is used within a data processing system or microprocessor to improve performance. The exponent precalculation is performed by calculating all possible exponents that could result for the given input operands (three possible result exponents in this implementation) in parallel with the mantissa calculations.

Each possible exponent result is calculated one at a time (serially) and stored in its own register. This technique requires the use of only a single adder, which is highly advantageous. The input operands are presented to the adder by a selection circuit (a multiplexer) for each operand. The correct exponent result is selected from one of the registers by a selection circuit (a multiplexer) controlled by the mantissa calculation logic at the time that the mantissa calculation has completed. Specifically, normalization and rounding control signals are used to select which exponent of the three exponents is the correct exponent for the given calculation.

Figure 2:
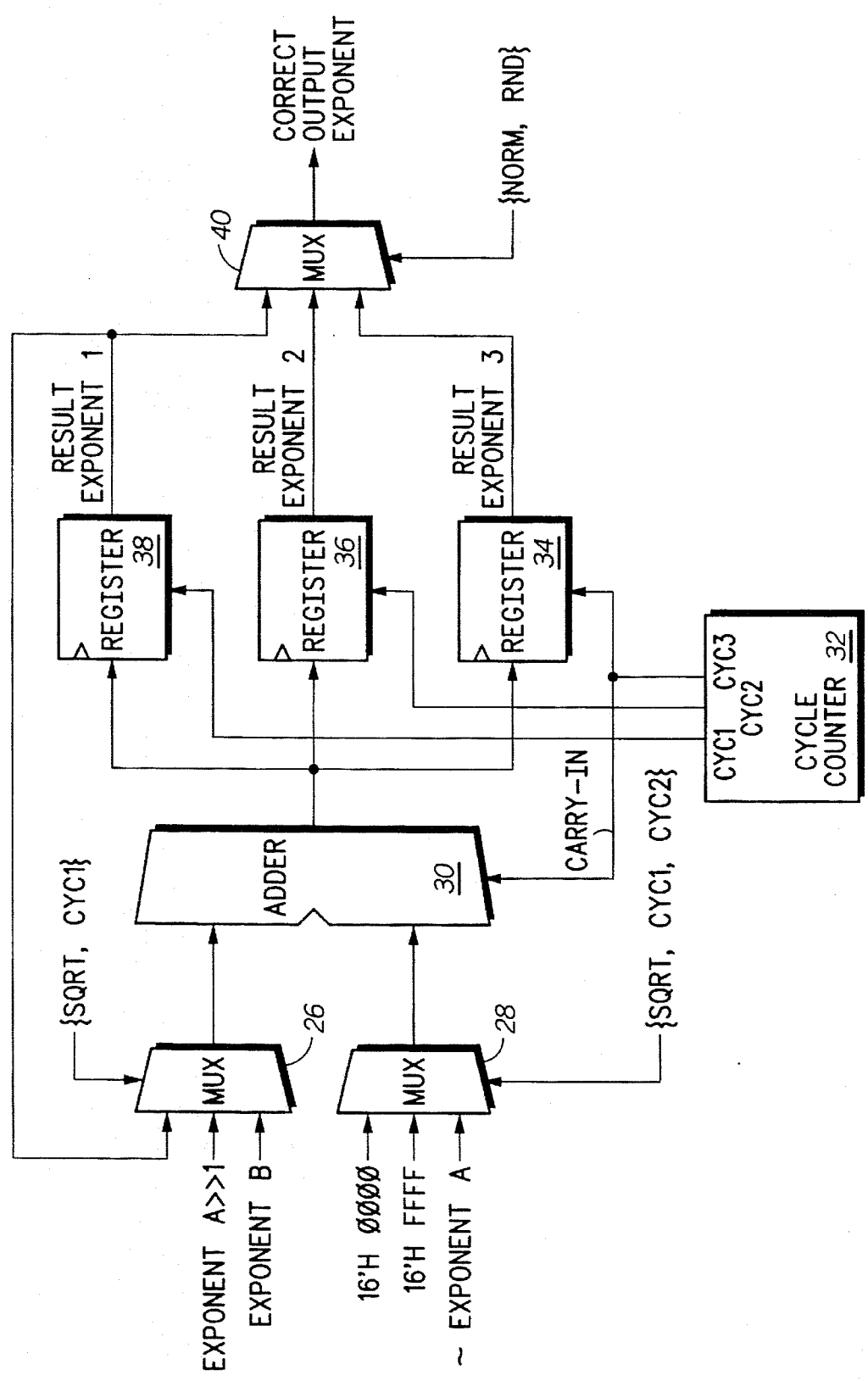
FIG. 2 illustrates, in a block diagram, a floating point exponent circuit for use within the data processing system, the floating point exponent circuit being in accordance with the present invention.
Figure 3:
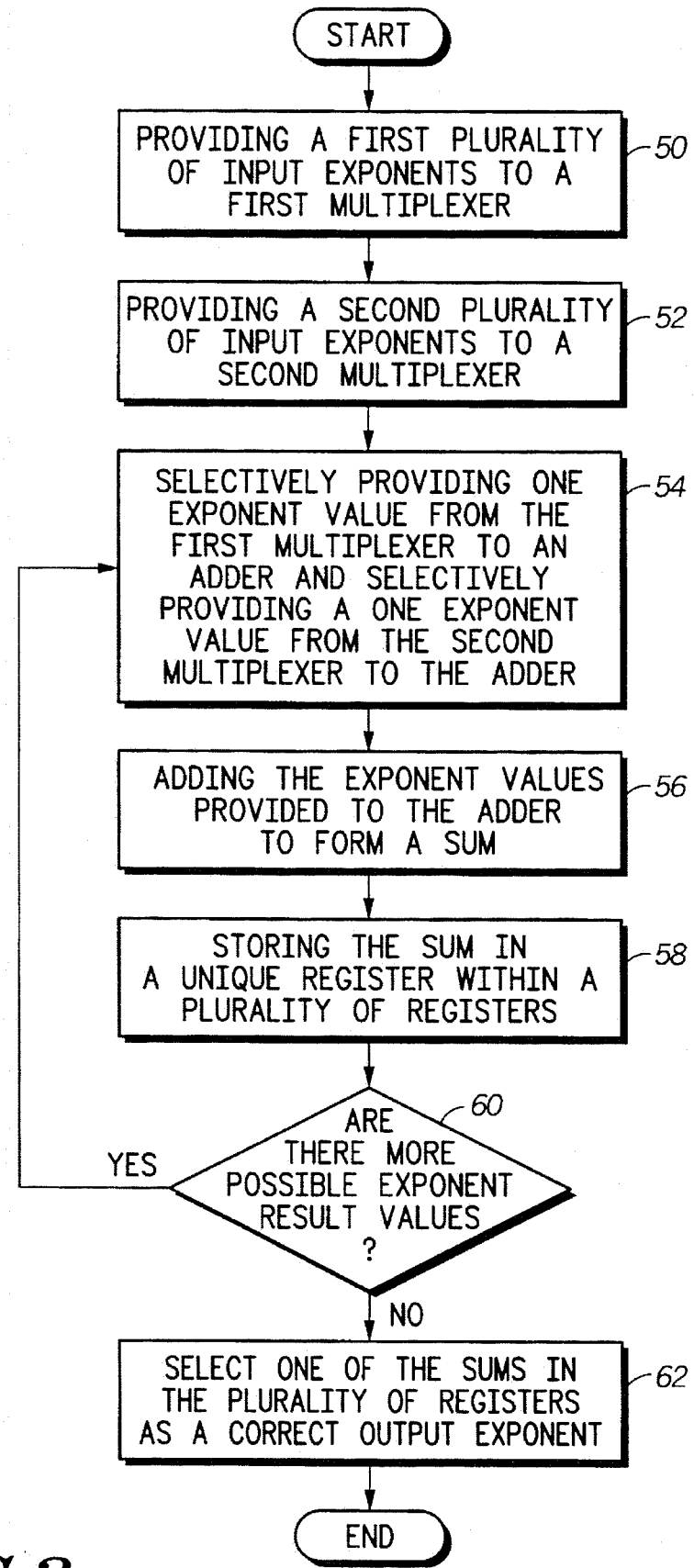
FIG. 3 illustrates, in a flowchart, a method for generating a floating point exponent value for a square root or divide operation in accordance with the present invention.

The present invention can be more fully understood with reference to the FIGS. 1–3. FIG. 1 illustrates a data processor system referred to as a data processor 10. The data processor 10 has an address bus which is used to output a value to select data from external memory. The data processor 10 has a data bus which is used to input and output data from external memory. The data processor 10 has several bus control signals which control the flow of data to and from external memory.

The data processor 10 contains a bus interface circuit 12 which is used to control the flow of data to and from an instruction cache and control circuit 16 and a data cache and control circuit 14. The instruction cache and control circuit 16 holds instructions which are subsequently communicated to an instruction fetch and decode circuit 18. The data cache and control 14 holds data for use by a pipelined execution unit 22. The instruction fetch and decode circuit 18 interprets the instructions from circuit 16 and controls a data fetch and register file circuit 20. The data fetch and register file circuit 20 controls the input of data which is communicated to the pipelined execution unit 22. A floating-point unit 24 is contained inside the pipelined execution unit 24 and performs floating-point calculations of the presented data. The exponent precalculation circuit, discussed above, is contained in the floating-point unit 24, and discussed in further detail below.

FIG. 2 illustrates a floating point exponent calculation circuit in accordance with the present invention. FIG. 2 illustrates several buses or a plurality of conductors which communicate input exponents to an adder 30 through multiplexers (MUXes) 26 and 28. The input values are values used to calculate the three exponents. The input exponents Exponent A>>1, Exponent B, 16'h 0000, 16'h FFFF, ~Exponent A are input to the MUXes 26 and 28. Exponent A>>1 is an input exponent of an operand A (referred to as Exponent A) shifted to the right by 1 bit position which is an equivalent value to Exponent A divided by two. Exponent B is an exponent of an input operand B, wherein A and B may be different floating point operand values. 16'h 0000 is a sixteen bit value of zero. 16'h FFFF is a sixteen bit value of negative one (−1). ~Exponent A is the exponent of the input operand A (referred to as Exponent A) inverted in value. All of these inputs are provided so that the following equations can be implemented. These equations calculate all possible result exponents for this implementation of floating-point divide operations and floating-point square root operations. The equations are as follows:

Floating-point Divide Equations:

Result Exponent 1=(Exponent B − Exponent A)

Result Exponent 2=(Exponent B − Exponent A)−1

Result Exponent 3=(Exponent B − Exponent A)−1

(EQs. 1–3)

Floating-point Square Root Equations:

Result Exponent 1 =(Exponent A>>1)

Result Exponent 2 =(Exponent A>>1)−1

Result Exponent 3 =(Exponent A>>1)+1

(EQs 4–6)

EQ. 1 or EQ. 4 (depending upon whether a divide or a SQRT is being performed) is calculated in cycle 1 (cyc1) of the circuit of FIG. 2 and stored in register 38. EQ. 2 or EQ. 5 (depending upon whether a divide or a SQRT is being performed) is calculated in cycle 2 (cyc2) of the circuit of FIG. 2 and stored in register 36. EQ. 3 or EQ. 6 (depending upon whether a divide or a SQRT is being performed) is calculated in cycle 3 (cyc3) of the circuit of FIG. 2 and stored in register 34.

If a floating point divide operation is performed between operands A and B, then one of three possible exponent values is a correct exponent value for the result. These three possible exponent values are listed above via EQs 1–3 (equations 1 through 3). The logic of FIG. 2 calculates these three result exponents and stores the three values in three register 34, 36, and 38.

If a floating point square root (SQRT) operation is performed on an operand A, then one of three possible exponent values is a correct exponent value for the resulting square root. These three possible exponent values are listed above via EQs 4–6 (equations 4 through 6). The logic of FIG. 2 calculates these three result exponents and stores the three values in three register 34, 36, and 38. Rounding and normalizing information from the mantissa calculation selects which of the three result exponents is the correct exponent.

The input exponents 16'h 0000, 16'h FFFF, and ~Exponent A are presented to multiplexer 28. The input exponents Exponent A>>1, Exponent B, and Result Exponent 1 are presented to multiplexer 26. The multiplexers each serve as a selection circuit of the input exponents. The multiplexer 26 selection is controlled by (1) a signal indicating the first cycle (cyc1) provided by a cycle counter 32; and by (2) a signal indicating whether or not the current instruction is square root (if it is not a square root then it is a divide). It should be apparent that a divide control signal may be used in place of the SQRT (square root) control signal in FIG. 2. The multiplexer 28 selection is controlled by (1) a signal indicating the first cycle (cyc1) provided by the cycle counter 32; (2) a signal indicating the second cycle (cyc2) provided by the cycle counter 32, and by (3) a signal indicating whether or not the current instruction is square root (SQRT). All internal control signals in FIG. 2 are provided by one of either the floating point unit, the mantissa calculation unit, the pipeline unit, and/or the instruction decode unit.

The input exponents selected by the multiplexer 26 and multiplexer 28 are presented to an adder 30. The carry-in of the adder 30 is a signal indicating the third cycle (cyc3) provided by the cycle counter 32. The carry-in is used to perform a +1 operation to an input exponent from one of the MUXes 26 and 28 on the third cycles (cyc3) wherein the third possible exponent is calculated and stored in register 34. The adder 30 adds the input exponents and the carry-in (supplied in cycle 3 (cyc3)) to produce three serially-calculated result exponents in each of the cycles 1 through 3 wherein each exponent value is stored in a unique one of a register 34, a register 36, or a register 38. The cycle counter 32 selects which register will store the output of the adder 30. The first cycle (cyc1) selects the register 38. The second cycle (cyc2) selects the register 36. The third cycle (cyc3) selects the register 34. Thus, the register 38 contains Result Exponent 1, the register 36 contains Result Exponent 2, and the register 34 contains Result Exponent 3, as discussed above.

The cycle counter 32 produces three signals based on the current instruction cycle. The cycle counter may be a shift register, a state machine, a ring counter, a plurality of D flip-flops, combinational logic or any number of circuits which are used to generate three mutually exclusive control signals in a sequence. Signal cyc1 asserts during the first execution cycle of the instruction. Signal cyc2 asserts during the second execution cycle of the instruction. Signal cyc3 asserts during the third execution cycle of the instruction. These signals are used to select one of the storage registers 34, 36, or 38, control the MUXes 26 and 28 to properly select the input exponents, and control the carry-in of the adder 30 to perform a selective +1 operation.

A multiplexer 40 selects one of the result exponents to produce the correct output exponent which is combined with the correct output mantissa and sign bit to produce the correct output floating point value for one of either a SQRT operation or a divide operation. The selection is controlled by (1) a signal from the mantissa logic that indicates whether or not the mantissa had to be shifted (norm signal); and (2) a signal from the mantissa logic that indicates whether or not an increment of the mantissa generated a carry out (rnd signal). The multiplexer 40 is ready to produce the correct output exponent in parallel with the completion of the mantissa calculation because all three possible values are available and waiting in the registers 34, 36, and 38 once the mantissa is ready.

FIG. 3 illustrates a method for generating the exponent for a square root operation or a divide operation in a floating-point unit. FIG. 3 illustrates a step 50 wherein a plurality of input exponents are presented to the first multiplexer 26. A step 52 wherein a plurality of input exponents are presented to the second multiplexer 28. A step 54 wherein one exponent value from the first multiplexer 26 is selectively presented to an adder 30 and one exponent value from the second multiplexer 28 is selectively presented to the adder 30. A step 56 wherein the adder 30 adds the exponent values to form a sum. A step 58 wherein the sum is stored in a unique register within a plurality of registers. A step 60 wherein a check is made to see if all of the possible result exponents have been calculated. If all of the possible result exponents have not been calculated, then the step 54 is the next executed step, otherwise a step 62 is the next executed step. The step 62 is used to select one of the sums in the plurality of registers as a correct exponent result value.

The present invention provides a method for calculating exponent values in a floating-point unit, a floating-point exponent circuit for processing exponent values, and a data processing system for processing floating-point exponent values. In prior systems, it is often the case that the exponent is not calculated until after the mantissa calculation has completed. The design illustrated in FIG. 2 and discussed in reference to FIGS. 1–3 provides a result exponent value quicker than prior systems due to the fact that the exponent has already been precalculated in parallel to the mantissa calculation. Other designs precalculate the exponent, but these known designs also use multiple adders to do so and therefore waste a significant amount of integrated circuit surface area to attain an exponent result. This invention utilizes only a single adder thereby reducing the circuit size and producing a more efficient design in terms of both calculation speed and circuit area requirements.

While the present invention has been illustrated and described with reference to specific embodiments, further modifications and improvements will occur to those skilled in the art. For example, different bus sizes may be used for input exponents, the correct output exponent, busses to and from the adder, or busses to and from the registers. Different types of selection circuits such as tristate buffers could be used instead of multiplexers. The multiplexers could be controlled by a set of control signals other than those used in the implementations. More or less than three result registers may be used/required. The cycle counter 32 could be alternatively built using a state machine, counter, ring counter, D flip-flops, shift register, or other similar circuit. This invention could be used with other operations besides floating-point divide and floating-point square root such as floating-point multiply. Different floating point standards and formats exist in the art and may be used with the invention described herein. It is to be understood, therefore, that this invention is not limited to the particular forms shown and that it is intended in the appended claims to cover all modifications that do not depart from the spirit and scope of this invention.

What is claimed is:

1. A data processing system comprising:

an execution device; and a floating point unit coupled to the execution device, the floating point unit comprising:

a single adder having a first input and a second input and an output;

a plurality of storage devices wherein each storage device in the plurality of storage devices has an input coupled to the output of the single adder so that each storage device is coupled to a same output of the single adder, each storage device in the plurality of storage devices having an output; and a selection circuit having an output and a plurality of inputs wherein each input in the plurality of inputs is coupled to a unique one output of one of the storage devices in the plurality of storage devices, wherein: (1) the single adder receives a first exponent value via the first input and a second exponent value via the second input in a first time period to produce a first result which is stored in a first storage device in the plurality of storage devices; and (2) the single adder receives a third exponent value via the first input and a fourth exponent value via the second input in a second time period which occurs after the first time period to produce a second exponent result which is stored in a second storage device in the plurality of storage devices, and wherein the selection circuitry selects one of either the first result or the second results from one of either the first storage device or the second storage device to provide as a correct exponent result via the output of the selection circuit.

2. The data processing system of claim 1 wherein: (3) the single adder receives a fifth exponent value via the first input and a sixth exponent value via the second input in a third time period, which occurs after both the first time period and the second time period, to produce a third result which is stored in a third storage device in the plurality of storage devices, and the selection circuitry selects one of either the first result, the second result, or the third result from one of either the first storage device, the second storage device, or the third storage device to provide a correct exponent result via the output of the selection circuit.

3. The data processing system of claim 2 wherein the first storage device stores the first exponent value minus the second exponent value, the second storage device stores the first exponent value minus the second exponent value minus one, and the third storage value stores the first exponent value minus the second exponent value plus one in response to the execution device executing a divide operation.

4. The data processing system of claim 2 wherein the first storage device stores the first exponent value shifted by one position, the second storage device stores the first exponent shifted by one position plus one, and the third storage device stores the first exponent shifted by one position minus one in response to the execution device executing a square root operation.

5. The data processing system of claim 2 wherein a first input selection circuit is coupled to the first input of the single adder and a second input selection circuit is coupled to the second input of the single adder, wherein: (1) the first input selection circuit provides the first exponent value as an exponent value A in the first time period, the second input selection circuit provides the second exponent value as an exponent value B in the first time period, and wherein a carry input of the single adder is set to zero in the first time period; (2) the first input selection circuit provides the exponent value A + exponent value B as the third exponent value in the second time period, the second input selection circuit provides the fourth exponent value as the value −1 in the second time period, and wherein a carry input of the single adder is set to zero in the second time period; and (3) the first input selection circuit provides the exponent value A + exponent value B as the fifth exponent value in the third time period, the second input selection circuit provides the sixth exponent value as the value 0 in the third time period, and wherein a carry input of the single adder is set to one in the third time period.

6. The data processing system of claim 2 wherein a second input selection circuit is coupled to the single adder circuit to provide the second input of the single adder with a value selected from a group consisting of: a binary equivalent of zero, a binary equivalent of −1, and a compliment of an operand exponent value.

7. The data processing system of claim 2 wherein a first input selection circuit is coupled to the single adder circuit to provide the second input of the single adder with a value selected from a group consisting of: the first result stored in the first storage device, a shifted exponent value, and exponent value different from the shifted exponent value.

8. The data processing system of claim 1 wherein the floating point unit calculates a mantissa value in parallel with the calculation of the first and second results wherein information provided by the calculation of the mantissa value is used by the selection circuit to select the correct exponent result.

9. The data processing system of claim 1 wherein the floating point unit further comprises:

a control circuit wherein the control circuit provides: (1) a first control signal which allows the first and second exponent values to be provided to the single adder and allows the first storage device to perform a storing operation on the first result; and (2) a second control signal which allows the third and fourth exponent values to be provided to the single adder and allows the second storage device to perform a storing operation on the second result.

10. The data processing system of claim 1 wherein the floating point unit further comprises:

a first input selection circuit coupled to the first input of the single adder, wherein the first input selection circuit selectively provides one of either the first exponent value or the third exponent value to the single adder; and a second input selection circuit coupled to the second input of the single adder, wherein the second input selection circuit selectively provides one of either the second exponent value or the fourth exponent value to the single adder.

11. The data processing system of claim 1 further comprising control circuitry for providing a first control signal and a second control signal wherein the first control signal is asserted in the first time period and the second control signal is asserted in the second time period that is subsequent in time to the first time period, the first control signal being used to provide the first and second exponent value and being used to store the first result in the first storage device and the second control signal being used to provide the third and fourth exponent value and being used to store the second result in the second storage device.

12. The data processing system of claim 1 wherein a state machine circuit provides a carry-in to the single adder.

13. A data processing system comprising:

an execution device; and a floating point unit coupled to the execution device, the floating point unit comprising:

a first input selection circuit for providing a first exponent value in a first time period, a second exponent value in a second time period occurring after the first time period, and a third exponent value in a third time period occurring after the second time period via an output wherein the first through third exponent values are selected from a first set of three input exponent values;

a second input selection circuit for providing a fourth exponent value in the first time period, a fifth exponent value in the second time period occurring after the first time period, and a sixth exponent value in the third time period occurring after the second time period via an output wherein the fourth through sixth exponent floating point values are selected from a second set of three input exponent values;

a single adder having a first input coupled to the output of the first input selection circuit, a second input coupled to the output of the second input selection circuit, and an output which provides a sum of the first exponent floating point provided via the first input and the second exponent floating point provided via the second input, the single adder receiving the first and fourth exponent inputs in the first time period and providing a first result, receiving the second and fifth exponent inputs in the second time period and providing a second result, and receiving the third and sixth exponent inputs in the second time period and providing a third result;

a first storage device having an input coupled to the output of the single adder and an output, the first storage device storing the first result;

a second storage device having an input coupled to the output of the single adder and an output, the second storage device storing the second result;

a third storage device having an input coupled to the output of the single adder and an output, the third storage device storing the third result; and an output selection circuit having a first input coupled to the output of the first storage device, and second input coupled to the output of the second storage device, third input coupled to the output of the third storage device, and an output for providing one of either the first, second, or third result.

14. The data processing system of claim 13 wherein the floating point unit further comprises:

control circuitry having a first output coupled to the first storage device for providing a first control signal used to store the first result, a second output coupled to the second storage device for providing a second control signal used to store the second result, a third output coupled to the third storage device for providing a third control signal used to store the third result.

15. The data processing system of claim 13 wherein a control signal indicating whether the single adder is used to determine a square root result or a divide result wherein the first through third results differ depending upon whether the square root result is needed or the divide result is needed.

16. The data processing system of claim 13 wherein the floating point unit further comprises:

control circuitry which provides a carry signal to the single adder.

17. A floating point exponent calculation unit comprising:

a first input selection circuit having a first input for providing a first exponent input value, a second input for providing a second exponent input value, a third input for providing a third exponent input value, and an output for providing one of either the first through third exponent input value;

a second input selection circuit having a first input for providing a fourth exponent input value, a second input for providing a fifth exponent input value, a third input for providing a sixth exponent input value, and an output for providing one of either the fourth through sixth exponent input value;

a single adder having a first input coupled to the output of the first input selection circuit, a second input coupled to the output of the second input selection circuit, and an output which provides a sum of the exponents provided by the first input of the single adder and the second input of the single adder;

a first storage device having an input coupled to the output of the single adder and an output;

a second storage device having an input coupled to the output of the single adder and an output;

a third storage device having an input coupled to the output of the single adder and an output;

a control circuit coupled to the first, second, and third storage locations for determining which of the first, second, or third storage devices is to store the sum provided by the single adder, the control circuit also providing a carry bit to the single adder; and an output selection circuit having a first input coupled to the output of the first storage device, and second input coupled to the output of the second storage device, third input coupled to the output of the third storage device, and an output for providing a correct output exponent value from one of either the first storage device, the second storage device, or the third storage device in response to mantissa control information.

18. The floating point exponent calculation unit of claim 17 wherein the floating point exception calculation unit provides correct output exponent values for both square root instructions and division instructions where both the floating point square root and divide instructions are provided from a memory.

19. A method for providing a correct floating point exponent value for a data processor, the method comprising the steps of:

providing six floating point exponent values through multiplexer circuitry to a single adder circuit;

manipulating mathematically several of the six floating point exponent values in a serial manner to serially produce more than one possible result exponent value via the single adder circuit;

storing the more than one possible result exponent value in storage devices coupled to the single adder circuit in a serial manner; and selecting, based upon mantissa information, one of the more than one possible result exponent value as the correct floating point exponent value.

20. The method of claim 19 further comprising:

performing the step of manipulating in parallel to a step of computing the mantissa of a floating point number, the mantissa and the one possible result exponent value being combined to make a single floating point value.

21. The method of claim 19 wherein the step of manipulating is used to provide more than one possible result exponent value for a floating point operation selected from a group consisting of: a square root operation and a divide operation.

22. The method of claim 19 wherein the step of providing six floating point exponent values to a single adder circuit comprises:

selectively providing the six floating point exponent values to the single adder as (1) one of the more than one possible result exponent values, (2) an exponent value of an operand, (3) an exponent value of an operand logically shifted in value, (4) a logical representation of binary zero, (5) a logical representation of binary $-1$, and (6) the complement of a operand's exponent value.

23. The method of claim 19 wherein the step of selecting involves providing mantissa normalization and mantissa rounding control signals to a multiplexer to select the correct output exponent value.

24. A method for providing a floating point exponent value for a data processor, the method comprising the steps of:

(a) providing up to six exponent values to a floating point exponent selection circuitry;

(b) communicating two of the up to six exponent values from the floating point exception circuitry to an single adder circuit;

(c) adding the two of the up to six exponent values to provide an exponent sum;

(d) storing the sum in a unique one of a plurality of exponent result registers;

(e) performing steps (b) through (d) until a predetermined number of unique sums have been stored in the plurality of exponent result registers; and (f) selecting, based upon floating point mantissa information, one of the predetermined number of unique sums as the correct output exponent value.

25. A method for determining a plurality of exponent values for a floating point calculation, the method comprising:

providing at least one floating point exponent value to only a single adder device via two multiplexers;

performing mathematical computations on the at least one floating point exponent in a serial manner to serially produce three result exponent values via the single adder circuit, the three result exponent values resulting from the execution of either a divide operation or a square root operation executed in a data processor wherein the three result exponent values have different values when performing a divide operation than the three result exponent values when performing a square root operation; and selecting, based upon mantissa information, one of the more than one possible result exponent value as a correct output exponent value for either the square root operation or the divide operation.

* * * * *